(12) United States Patent
Leask et al.

(10) Patent No.: US 6,412,106 B1
(45) Date of Patent: Jun. 25, 2002

(54) GRAPHICAL SYSTEM AND METHOD FOR DEBUGGING COMPUTER PROGRAMS

(75) Inventors: Gary M. Leask, Dallas; Dale L. Huffman, Allen, both of TX (US)

(73) Assignee: InterVoice Limited Partnership, Reno, NV (US)

( * ) Notice: Subject to any disclaimer, the term of this patent is extended or adjusted under 35 U.S.C. 154(b) by 0 days.

(21) Appl. No.: 09/334,251

(22) Filed: Jun. 16, 1999

(51) Int. Cl.[7] .............................................. G06F 9/44
(52) U.S. Cl. ..................... 717/124; 717/125; 717/148
(58) Field of Search .................... 717/4, 7, 8, 9, 717/128, 129, 131, 140, 124, 142, 143; 702/119; 703/23; 714/799

(56) References Cited

U.S. PATENT DOCUMENTS

| | | | |
|---|---|---|---|
| 4,080,650 A | 3/1978 | Beckett | 364/200 |
| 4,802,165 A | 1/1989 | Ream | 371/19 |
| 5,038,348 A | 8/1991 | Yoda et al. | 371/19 |
| 5,093,914 A | 3/1992 | Coplien et al. | 395/700 |
| 5,226,162 A | 7/1993 | Daw | 395/700 |
| 5,265,254 A | 11/1993 | Blasciak et al. | 395/700 |
| 5,533,192 A | 7/1996 | Hawley et al. | 395/183.04 |
| 5,778,230 A | 7/1998 | Wimble et al. | 395/704 |
| 5,835,699 A | 11/1998 | Kimura | 395/183.1 |
| 5,889,988 A | 3/1999 | Held | 709/103 |
| 5,898,873 A | 4/1999 | Lehr | 717/125 |
| 5,913,195 A * | 6/1999 | Weeren et al. | 704/270 |
| 5,926,176 A | 7/1999 | McMillan et al. | 345/764 |
| 5,940,593 A * | 8/1999 | House et al. | 709/203 |
| 5,946,485 A * | 8/1999 | Weeren et al. | 717/3 |
| 5,956,479 A | 9/1999 | McInerney et al. | 395/183.14 |
| 6,011,920 A * | 1/2000 | Edwards et al. | 717/4 |
| 6,016,474 A | 1/2000 | Kim et al. | 705/1 |
| 6,042,614 A * | 3/2000 | Davidson et al. | 717/4 |
| 6,077,312 A * | 6/2000 | Bates et al. | 717/4 |
| 6,226,787 B1 | 5/2001 | Serra et al. | 717/125 |
| 6,247,020 B1 * | 6/2001 | Minard | 707/104 |
| 6,249,907 B1 | 6/2001 | Carter et al. | 717/125 |
| 6,253,368 B1 * | 6/2001 | Nelin et al. | 717/4 |
| 6,275,956 B1 | 8/2001 | On et al. | 717/125 |
| 6,282,701 B1 | 8/2001 | Wygodny et al. | 717/125 |
| 6,311,327 B1 | 10/2001 | O'Brien et al. | 717/114 |

FOREIGN PATENT DOCUMENTS

WO  WO 01/25912 A1  4/2001  ............. G06F/9/44

OTHER PUBLICATIONS

International Search Report dated Sep. 16, 2000 (PCT/US00/14574).
Wahbe et al, "Practical data breakpoints: design and implemenation", ACM SIGPLAN, pp 1–12, Jun. 1993.
Gilles et al, "A window based visual debugger for a real time Ada tasking environment", ACM pp 59–67, 1988.
Brooks et al, "A new appracsh to debugging optimized code", ACM SIGPLAN, pp 1–11, Jun. 1992.
Crossno et al., "Visual debugging of visualization software: a case study of particle system", IEEE, pp 417–421, 1999.

* cited by examiner

*Primary Examiner*—Anil Khatri
(74) *Attorney, Agent, or Firm*—Fulbright & Jaworski L.L.P.

(57) ABSTRACT

A system and method for graphically debugging a computer program is disclosed. In a preferred embodiment, a graphical debugging environment is provided, which is capable of displaying a graphical representation of an application program to be debugged. Thereafter, the graphical debugging environment allows a user to insert debugging tools, such as breakpoints, directly into the graphical representation of the application program. Thus, a user is not required to interact with the textual source code of an application program when debugging it. The graphical debugging environment may display indicators illustrating where debug tools have been inserted within the application program. In a preferred embodiment, the graphical debugging environment allows a user to perform debugging during an application program's runtime. Thus, a user is not required to halt an application program prior to debugging it. Also, in a preferred embodiment the graphical debugging environment executing on a local computer may be used to debug an application program residing on a remote computer.

52 Claims, 7 Drawing Sheets

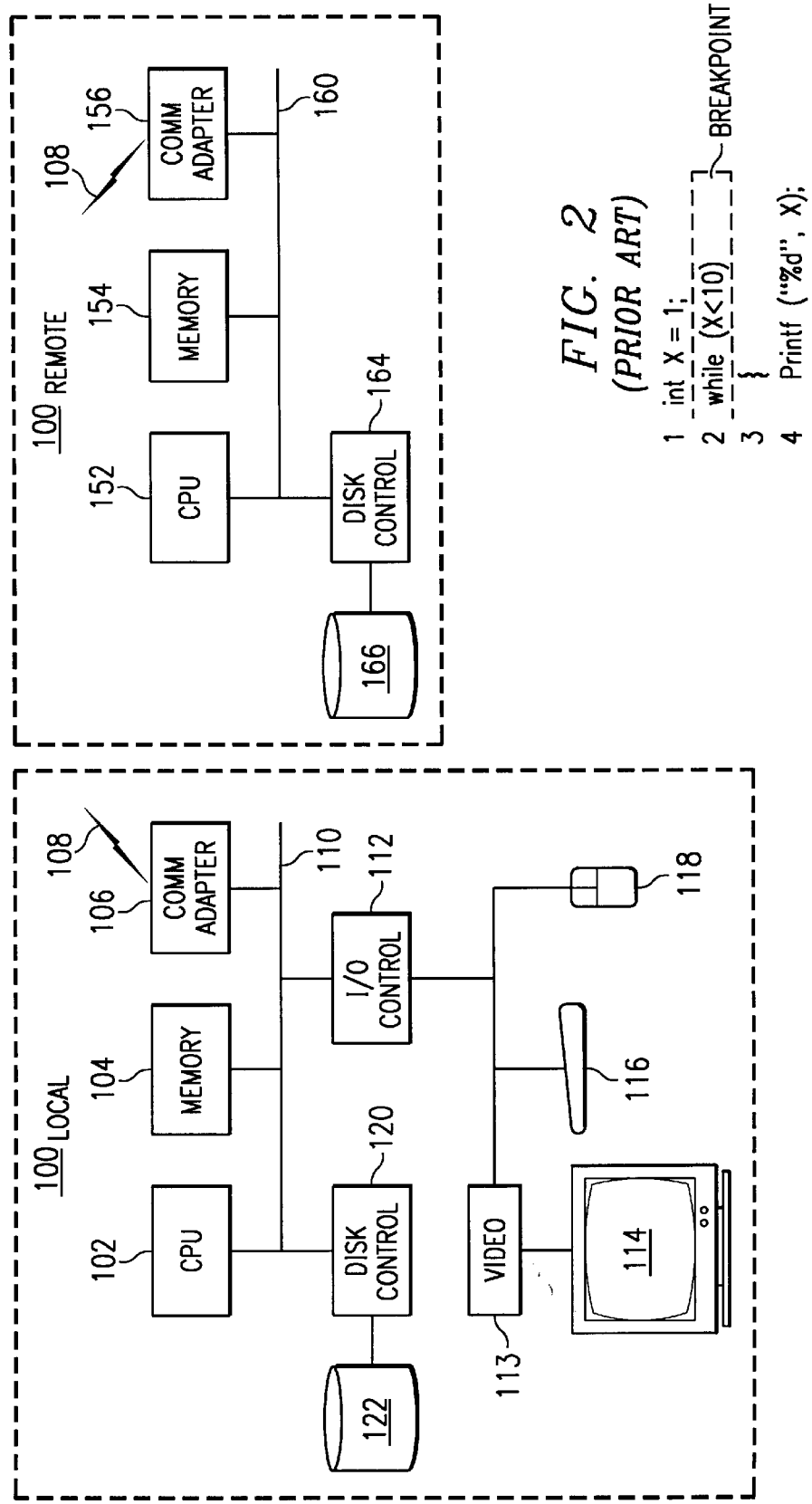

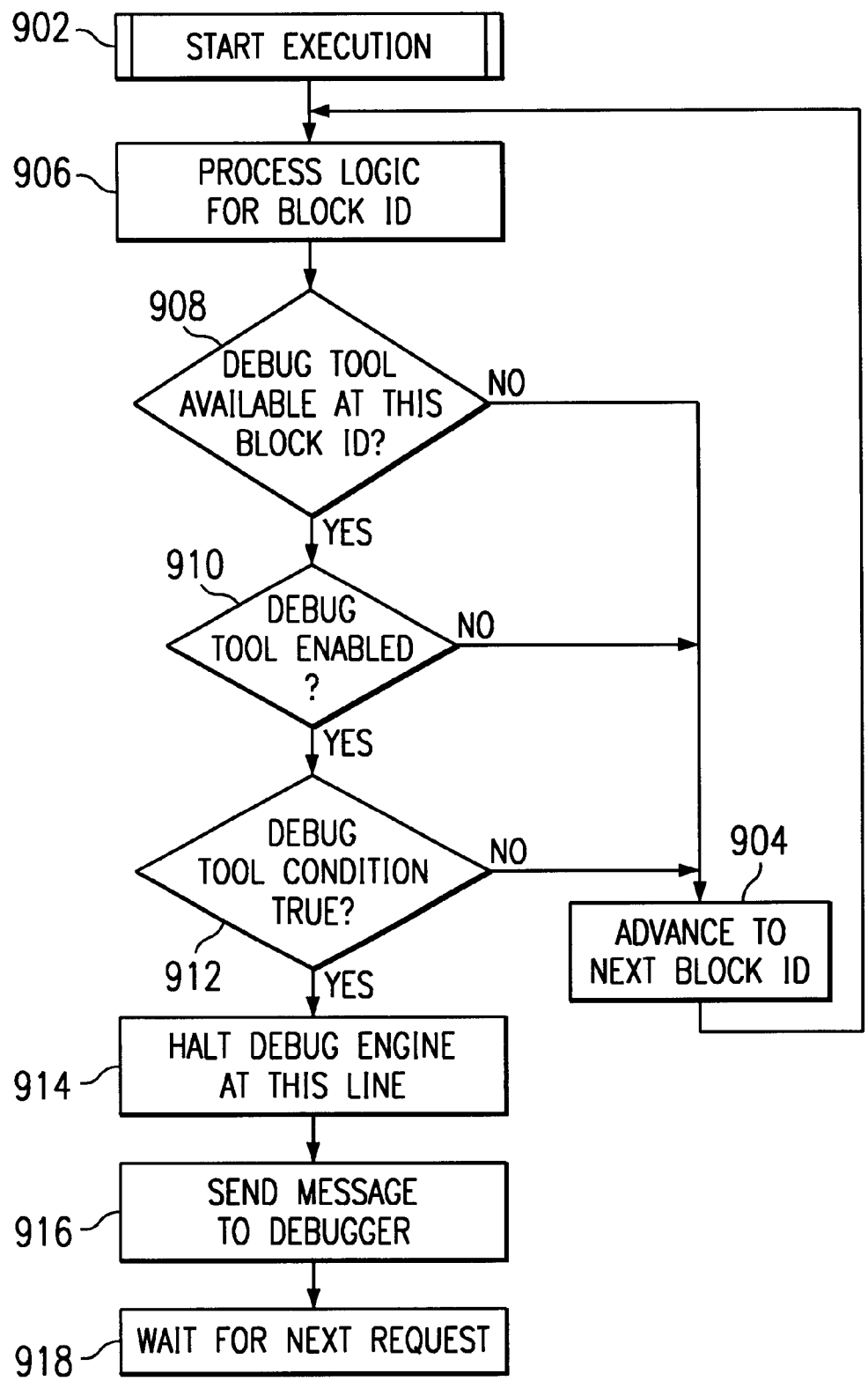

GRAPHICAL SYSTEM AND METHOD FOR DEBUGGING COMPUTER PROGRAMS

RELATED APPLICATIONS

This application is related to co-pending and commonly assigned U.S. Application Ser. No. 08/599,134 filed Feb. 9, 1996, entitled "ENHANCED GRAPHICAL DEVELOPMENT ENVIRONMENT FOR CONTROLLING PROGRAM FLOW," co-pending and commonly assigned U.S. application Ser. No. 08/774,234 filed Dec. 27, 1996, entitled "SYSTEM AND METHOD FOR DEVELOPING VRU VOICE DIALOGUE," and co-pending and commonly assigned U.S. application Ser. No. 08/900,237 filed Jul. 24, 1997, entitled "MULTIMEDIA SCRIPTING TOOL," the disclosures of which are hereby incorporated herein by reference.

TECHNICAL FIELD

The invention relates generally to debugging computer programs and more particularly to graphically debugging computer programs.

BACKGROUND

The design and use of computer hardware and software programs are well known in the art, and need not be described here in any great detail. The following overview is presented merely to provide a context within which the present invention may be understood.

A computer program is a set of instructions that directs the functioning of various computer hardware resources in order to accomplish a particular task. In order to run a computer program, that program is typically loaded into the computer's main memory, where each instruction within the program is stored at a unique location, specified by an address. The group of address locations occupied by the program is referred to as the instruction space of the program. During program execution, the computer's control unit generally fetches and executes instructions in sequence. Fetching begins at a predefined start location within the program, and continues in sequence unless some type of branch instruction is encountered, or some other event, such as an interrupt, occurs. Branch instructions and interrupts will cause the control unit to begin fetching instructions from a new location that is not the next sequential instruction address within the instruction space. Program execution then proceeds in sequence beginning at this new memory location, until another branch or interrupt is encountered.

Although each computer instruction is really a set of electrical signals, each of which typically assumes one of two values, those who create, or write, computer programs (e.g., programmers or developers) usually use symbols that represent the various possible combinations of electrical signals. At the lowest level, these symbols may simply be a string of ones and zeroes, representing on a one for one basis each of the electrical signals that make up an instruction. More often, however, these symbols comprise alphanumeric characters which are arranged to form mnemonics in a programming language, each mnemonic representing an instruction or part of an instruction.

Prior art development environments used programming languages (or "scripting languages") to control the flow of an application. The languages allowed programmers to develop computer programs by utilizing the programming language to produce textual source code. That is, programmers utilized the programming language to produce textual source code made up of instructions, such as "if-then" statements.

More recently, graphical development environments are being utilized by programmers to develop computer source code using icons to represent various language components, such as a while-loop, an if-branch, or a user-defined subroutine. For example, a graphical development environment may allow a programmer to place an icon in a program that represents an "if-then" statement, rather than typing the textual source code for such an instruction. Such icons may be logically arranged to create the program flow for a program. Typically, a graphical development environment represents a program flow as a sequence of icons connected by arrows. An example of such a graphical development environment is provided in co-pending, commonly assigned U.S. application Ser. No. 08/599,134 filed Feb. 9, 1996, entitled "ENHANCED GRAPHICAL DEVELOPMENT ENVIRONMENT FOR CONTROLLING PROGRAM FLOW." Typically, graphical development environments allow a programmer to view the underlying source code represented by a particular icon if the programmer so desires. For example, a developer may simply double-click on an icon to reveal the underlying textual source code represented by that particular icon.

In recent years, software has had increasing importance in the computer industry. Software is used to control many increasingly complex processes, and the software itself has in turn become increasingly complex. Accordingly, computer program developers must ensure that their programs actually perform the task(s) that they are designed to perform. The act of making this determination is generally referred to as testing the software, and the act of identifying the cause of an identified problem, or a "bug," in a program is generally referred to as "debugging" the software.

Traditional debugging methods include slow manual processes such as inserting print statements into the software at particular locations so that the values of variables and the like may be checked to determine if they have the expected values. That is, a programmer may insert print statements in the textual source code of a program to check the values of variables or other information at certain points in the execution of the source code.

To facilitate the debugging process, computer programs called "debuggers" have been created. A typical debugger supplies a program control interface to the programmer that allows the programmer to do such things as executing only one program instruction at a time (referred to as "single stepping" the program), determining what the next instruction to be executed is, examining and/or modifying computer register and memory locations, and setting breakpoints at particular locations within the program, whereby computer program execution will continue unimpeded until the breakpoint is the next location in the program that is to be executed by the computer. These features, and others, greatly assist the programmer in determining whether the sequence of program instruction execution is as expected, and whether the correct data is being moved from one computer resource to another. This view into the actual operation of the program allows the programmer to identify errors made in the program design in order to "debug" the program.

A debugger is generally a tool that aids software development by giving the programmer control over and access to information about a running program. Debuggers typically run as self-contained processes, controlling the program under study (i.e., the application program) through operating system primitives designed for that purpose. A simple application program typically consists of data, and functions that operate on those data. Data and functions are defined in a source file created by the programmer (i.e., the "source code"). Each datum is associated with a type that describes its internal structure and behaviors; for example, integers may be 16 bits long, and may be added, subtracted, multiplied, etc. A tool called a compiler or translator reads a source file and produces an object file. The compiler typically works in conjunction with other tools—assemblers, linkers, and optimizers—to accomplish this task, although such ancillary tools may be invisible to the programmer.

The object file contains bits which can be loaded into computer memory and executed; these bits include both the data and the machine instructions generated from the original program. These bits, when loaded into memory, are called the program image. In most systems, there is a close mapping of program image onto what the user perceives as a user process. The object file also contains a table that maps some of the original source information, as variable and function names, onto addresses, offsets, sizes, and other pertinent properties of the program image. This so-called symbol table is usually not made part of the program image itself, but remains in the object file where other programs (like the debugger) can read and analyze it.

A debugger is generally used to examine the program image of a program in execution, and to control the execution of the program. Because the debugger generally has access to the symbol table, it allows the user to interact with the target process (i.e., the application program) in terms of the names found in the source code. For example, if the user knows the name of a variable, the user can ask the debugger to retrieve that variable's current contents from the program image or from storage dynamically allocated at run time by giving the variable's name. By going to the symbol table and looking up the variable's address and type, the debugger obtains the information it needs to satisfy the user request. An analogous scenario might allow the user to modify the value of a variable's contents on the fly.

A debugger can generally arrange to perform certain debugging operations when the target program counter reaches some pre-specified address. The debugger can deposit a machine instruction at that address, designed to cause some trap or to cause an operating system service to be called when it is executed. By virtue of prior arrangements between the debugger and the operating system, several things may happen when the target reaches one of these instructions, including: 1) execution of the target process is put aside (i.e., the target process is stopped); and 2) the debugger is notified of the event and gains control. The debugger is typically able to determine the location of the event by examining program image state information saved by the operating system. Such special instructions, or the loci of such instructions, are called breakpoints. The event of execution arriving at a breakpoint is called the firing of a breakpoint.

Breakpoints are usually set at the direction of a programmer, who may want to know if and when execution reaches a certain point in a program, and may further wish to examine state information after the breakpoint fires. The programmer typically specifies where to insert the breakpoint, such as upon entry to a function or at a location corresponding to some line number in the source code. Current debuggers generally require that a programmer insert a breakpoint, or other debug tool, directly in the textual source code of a program. That is, if a programmer desires to insert a breakpoint just prior to the program performing a particular function, the programmer must find that particular function within the textual source code and insert a breakpoint indicator within the textual source code. A breakpoint indicator is generally inserted into the textual source code of a program by pressing a particular sequence of keys or by choosing to insert a breakpoint from a toolbar provided by the debugging program.

Generally, even programmers using graphical development environments are required to access the textual source code of a program in order to use debugging tools, such as breakpoints. That is, a programmer using a graphical development environment will typically be required to view the textual code underlying the graphical icons and set breakpoints or other debugging tools within the textual source code. Therefore, prior art debugging tools are utilized in much the same way by programmers, regardless of whether the programmer is using a textual development environment or a graphical development environment.

SUMMARY OF THE INVENTION

The operation of debugging programs is well known in the art. Such debugging programs are often included along with a particular programming language, such as C, C++ or Pascal. When debugging an application written in some programming languages, well known underlying operations typically used in debugging programs to perform certain debugging functions may be utilized within the graphical debugging environment disclosed herein. That is, for some programming languages the specific operations performed by a debugging program to accomplish performance of a breakpoint or to accomplish stepping through a program, as examples, may be utilized within the graphical debugging environment disclosed herein. For other programming languages, a particular method for performing the underlying operations may be required. For example, a debug engine may be utilized to perform the underlying operations, as discussed in greater detail hereafter. The present invention is intended to encompass both programming languages capable of being debugged using well known underlying operations within the graphical debugging environment, as well as those languages that require a specific method, such as a debug engine, to perform the underlying operations for a debugging tool.

Several problems exist with the prior art methods of debugging computer programs. As discussed above, one debug method requires inserting print statements throughout the source code of a program. Such an approach is no longer desirable because it results in very high overhead and intrusion on the operation of the code being examined. When a problem occurs in a program, the programmer inserts the print statements in essentially a hit and miss way in order to try to locate the error. When the program first fails, there are normally no print statements in the code that would indicate to the programmer where to look for the error. Thus, the programmer must either use some separate method to find the general location of the error, or scatter print statements at random throughout the program in the hope that at least one print statement will provide some clues about where the problem lies. Of course, the more subtle the problem, the less likely the programmer is to choose the proper location for a print statement on the first try. Therefore, at the outset at least, the programmer has no logical place to start the debugging process.

In order to collect a significant amount of data from which to look for symptoms of an error, the programmer must insert a large number of print statements. Accordingly, a great deal of time may be spent creating these statements. Moreover, for a program developer to use the print statements effectively, the developer must be intimately familiar with the source code of the program. That is, because the developer must physically insert the print statements in certain locations of the source code, the developer must be familiar enough with the code to understand where to effectively insert such print statements. A developer may be debugging a program that was written by the developer a fairly long time ago or that was written, in part or entirely, by another programmer. Therefore, it may be very difficult and time consuming for the developer to decipher the textual source code to determine where to best insert print statements.

An additional problem with using print statements to debug a computer program is that such print statements cannot be inserted into the program during runtime of the program. Inserting print statements typically requires that all or part of the program be recompiled and relinked, which may be a time consuming process. Likewise, when the programmer decides to remove a print statement, typically the program must be recompiled and relinked again. This also takes time. Once the print statement is removed, it may not be reinserted without again recompiling. Thus, each insertion or deletion of a print statement requires that a program be halted (if it was running), recompiled, and then restarted. Therefore, utilizing print statements to debug a program requires significant time and effort on the part of a programmer.

Also as discussed above, debugging programs have been developed to assist programmers. A problem with the prior art debugging programs is the way in which breakpoints and other debug tools must be used by a programmer. More specifically, the prior art debugging programs require a programmer to be intimately familiar with and interact with the textual source code of an application program in order to effectively utilize such debugging programs. For example, if a developer wants to use a breakpoint to debug a particular program, the developer must select a particular line of the textual source code and insert a breakpoint indicator at the selected line of the application program. Therefore, just as with inserting print statements to debug a program, utilizing prior art debugging programs requires that the developer be intimately familiar with the textual source code of the program. This problem is compounded when it is considered that most programs today are written in textual programming languages, without any graphical representation of the operation of the program to assist a programmer in understanding the program flow. Therefore, the programmer must read through lines and lines of textual source code prior to even making the initial decision of where to effectively place a breakpoint or other debug tool.

Even if a programmer is using a graphical development environment, prior art debugging programs still require the programmer to insert a breakpoint or other debug tool in the textual source code underlying the graphical icons. That is, programmers must interact with the textual source code represented by the graphical icons in order to effectively utilize prior art debugging programs. This is particularly problematic because programmers using a graphical development environment are required to become intimately familiar with the underlying textual source code in order to effectively debug an application using prior art debugging tools. Such programmers may be only accustomed to working with graphical icons to develop a program, and may not be accustomed to working with the textual source code underlying each icon. Accordingly, such debuggers defeat much of the purpose of having a graphical development environment because the programmers are still required to become intimately familiar with the underlying textual source code. In some cases, programmers using graphical development environments may find it especially difficult to debug an application by interacting with the underlying textual source code because such programmers may not be familiar with the underlying textual source code language. Rather, such programmers are typically more familiar and accustomed to developing the application program through a graphical environment.

An additional problem with using prior art debugging programs to debug a computer program is that such debugging programs generally do not allow breakpoints or other debug tools to be inserted into a program, removed from a program, or modified (such as modifying a debug tool's state or conditions associated with a debug tool) during runtime of the program. Inserting, removing, or modifying breakpoints or other debug tools generally requires that a program be halted (if it was running), and then the program must be restarted thereafter. That is, prior art debugging programs generally require an application's execution to be halted before inserting, removing or modifying a debug tool in the source code of an application program, and then execution of the application program must be restarted after the debugging tools have been inserted, removed or modified to perform the desired debugging of the application program.

Yet another problem with using prior art debugging programs to debug a computer program is that such debugging programs generally only allow one application program to be debugged at a time. That is, a program developer typically cannot debug multiple programs concurrently within prior art debugging programs. Accordingly, a program developer's efficiency is limited because the developer is unable to effectively multi-task in debugging multiple programs. Rather than debugging multiple programs concurrently, a developer is required to debug only a single application program at a time with prior art debuggers.

In view of the above, there exists a desire for a method and system for debugging computer programs. There is a further desire to provide a method and system for debugging computer programs which allow a programmer to insert breakpoints and other debug tools graphically. That is, there exists a desire for a method and system for debugging computer programs which allow a programmer to insert breakpoints and other debug tools directly into a graphical representation of a computer program without being required to interact with the underlying textual source code. There exists a desire for a method and system for debugging computer programs which allow a programmer to remove and modify existing debug tools by interacting directly with a graphical representation of a computer program, rather than being required to interact with the underlying textual source code of the program.

Furthermore, there exists a desire for a method and system for debugging computer programs which allow a programmer to insert breakpoints and other debug tools into a graphical representation of a computer program during the program's runtime. Likewise, there exists a desire for a method and system for debugging computer programs which allow a programmer to modify attributes of existing debug tools and remove (i.e., clear) debug tools from a graphical representation of a computer program during the program's runtime. There is a further desire for a method and system for debugging computer programs which allows graphical debugging of multiple application programs concurrently.

These and other objects, features and technical advantages are achieved by a system and method which allow a programmer to perform debug tool management by interacting directly with a graphical representation of a computer program. More specifically, a graphical debugging environment is disclosed, which allows a program developer to insert, remove, and modify breakpoints and other debug tools by interacting directly with a graphical representation of a computer program.

In a preferred embodiment, a graphical representation of an application program to be debugged is displayed to a developer. For example, underlying source code of the application program may be represented by interconnected icons. Such a graphical representation may represent a computer program that is stored either locally or remotely. Additionally, such a graphical representation may represent a program that is currently executing either locally or remotely, or the graphical representation may represent a program that is not currently executing. A developer may then utilize the graphical debugger environment to insert debugging tools, such as breakpoints, directly into the graphical representation of the application program.

Advantageously, the developer is not required to insert such debugging tools into the underlying textual source code of the application program, but can insert the debugging tools directly into the graphical representation of the application program. Once the debug tools are inserted into the graphical representation of the application program, the debug tools themselves may be represented graphically to indicate which tools are currently set in the program and the point of the program at which each tool is currently set. In a preferred embodiment, the debug tools, such as breakpoints, may be set while the application program being debugged is executing, without requiring that the application be halted. Likewise, a preferred embodiment also allows for such debugging tools to be modified or removed from the application program without requiring that the application be halted.

Moreover, in a preferred embodiment, a developer may debug multiple programs concurrently utilizing a graphical debugging environment. Thus, a developer may simultaneously debug a number of programs in such a graphical debugging environment. Accordingly, a developer may insert and remove debug tools and otherwise monitor and interact with multiple programs concurrently.

It should be appreciated that a technical advantage of one aspect of the present invention is that a system and method for debugging computer programs graphically are provided wherein a developer is not required to interact with the textual source code of an application program in order to debug it. Accordingly, a developer may utilize the debugging tools more effectively by interacting directly with a graphical representation of the application program.

A further technical advantage of one aspect of the present invention is that a system and method for debugging computer programs graphically are provided wherein an application program is not required to be halted in order to insert debugging tools into the program and effectively debug it. Likewise, a technical advantage of one aspect of the present invention is that a system and method for debugging computer programs graphically are provided wherein an application program is not required to be halted in order to modify or remove debugging tools from the program. Accordingly, a developer may effectively debug an application program without being required to halt the program by, for example, inserting breakpoints while the program is running.

Still a further technical advantage of one aspect of the present invention is that a system and method for debugging computer programs graphically are provided wherein an application that is stored and/or executing remotely can be debugged utilizing a debugging program that is executing locally. Accordingly, a debugging program is not required to be executing at each remote site where an application program is stored and/or executing.

Yet a further technical advantage of one aspect of the present invention is that a system and method for debugging computer programs graphically is provided wherein multiple application programs may be debugged concurrently utilizing a graphical debugging environment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 1 illustrates an example of a personal computer system capable of utilizing the graphical debugger of the present invention;

FIG. 2 illustrates an example of a prior art breakpoint in a textual development environment;

FIG. 9 illustrates a flow diagram for the operation of a debug engine in a preferred embodiment.

DETAILED DESCRIPTION

Figure 3:
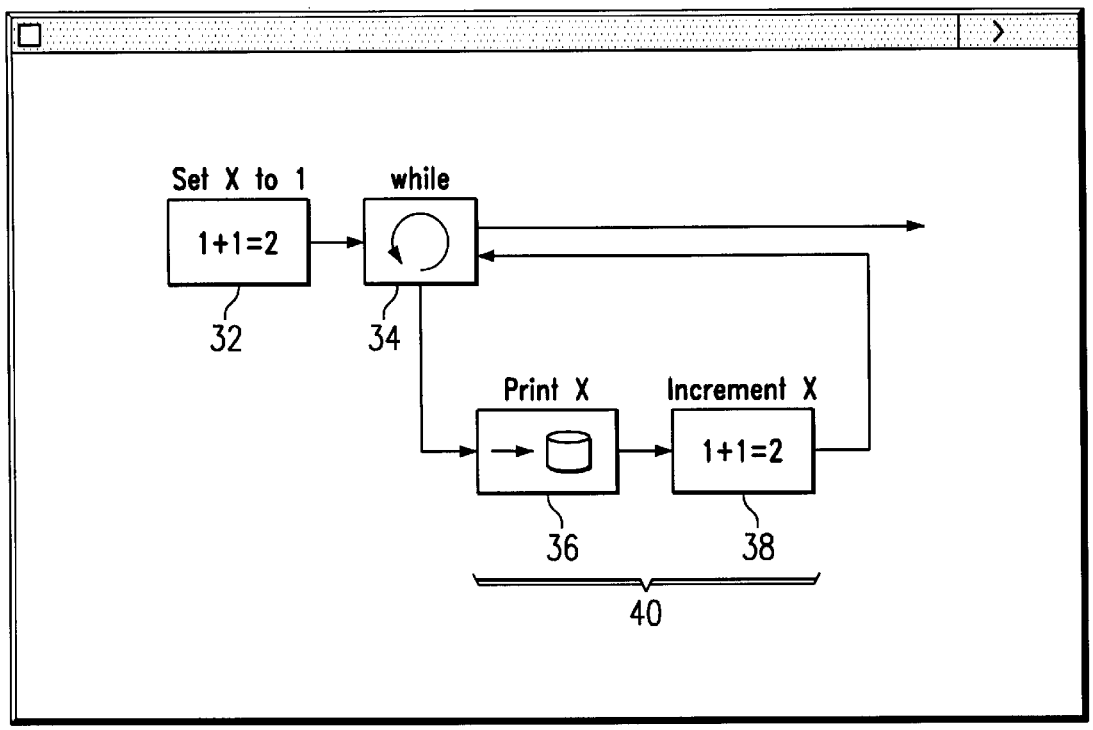
FIG. 3 illustrates an example of a graphical development environment having a graphical representation of a computer application that is functionally equivalent to the textual program represented in FIG. 2.

FIG. 1 illustrates an example of an environment in which the graphical debugger may be utilized. A local personal computer system $100_{LOCAL}$ (PC) adapted to execute the graphical debugger of the present invention is shown. Illustrated are a central processing unit (CPU) 102, which may be coupled via bus 110 to memory 104, communications adapter 106, disk controller 102 and input/output (I/O)

controller 112. Disk controller 120 may be coupled to storage device 122, and communications adapter 106 may be coupled to network 108. I/O controller 112, in turn, may be coupled to video controller 113, keyboard 116, and pointing device 118. Various other input devices (not shown) may be included at local computer $100_{LOCAL}$. Video controller 113 may be coupled to display device 114. Additionally, various other peripheral equipment (not shown) may be included at local computer $100_{LOCAL}$.

A computer system $100_{REMOTE}$ operating at a remote location over network 108 is also shown. Network 108 may be any type of communications network including, but not limited to direct PC to PC connection, a local area network (LAN), a wide area network (WAN), modem to modem connection, the Internet, a combination of the above, or any other communications network now known or later developed within the networking arts which permits two or more computers to communicate with each other. Illustrated are a CPU 152, which may be coupled via bus 160 to memory 154, communications adapter 156, and disk controller 164. Disk controller 164 may be coupled to storage device 166, and communications adapter 156 may be coupled to network 108. Even though not illustrated in FIG. 1, remote site $100_{REMOTE}$ may also include an I/O controller being coupled to a video controller, keyboard, and pointing device, as well as other input devices. Additionally, a display device being coupled to a video controller, as well as various other peripheral equipment may be included at remote site $100_{REMOTE}$.

As is well known in the computer arts, CPU 102 may execute programs residing in storage device 122 and memory 104. The programs may utilize video controller 113 to display results on monitor 114. A programmer or developer may input commands into PC 100 via keyboard 116 and pointing device 118. Likewise, CPU 152 may execute programs residing in storage device 166 and memory 154. Additionally, CPU 102 may execute programs residing at some remote location on network 108, such as programs residing in storage device 166 and memory 154. Likewise, CPU 152 may execute programs residing at some location remote to CPU 152 via network 108, such as programs residing in storage device 122 and memory 104. Additionally, local computer $100_{LOCAL}$ may allow a user to access, view, and/or interact with an application program running on remote computer $100_{REMOTE}$ via network 108.

Moreover, the graphical debugger of the present invention is adapted to execute within an operating system having a graphical user interface (GUI). Therefore, the present embodiment can be adapted for use under IBM's OS/2™, Microsoft's WINDOWS 3.1™, WINDOWS 95™, WINDOWS NT™, or UNIX X Windows™, as examples, or on an operating system without a GUI, such as Microsoft MS-DOS, but capable of running a program with a GUI. A preferred embodiment of the present invention is utilized with the InVision™ application development tool to allow debugging of InVision™ applications. InVision™ products are made by Intervoice, Inc. located in Dallas, Tex.

In a preferred embodiment, the graphical debugger of the present invention is used to debug programs or applications for voice response systems ("VRUs") in the telecommunications environment. Accordingly, this discussion focuses on such applications and sometimes refers to the flow of the application program from start to finish as the "call flow." It must be understood, however, that the present invention can be used to debug any sort of application program and is not limited only to telecommunication applications. In a preferred embodiment, the graphical debugger is running on a local system, such as $100_{LOCAL}$ shown in FIG. 1. An application program to be debugged may be running either on the local system $100_{LOCAL}$ or on a remote system, such as $100_{REMOTE}$ shown in FIG. 1. Accordingly, the graphical debugger program running on local computer $100_{LOCAL}$ may be utilized to debug locally stored programs or programs stored at remote locations (e.g., $100_{REMOTE}$) via network 108.

Turning to FIG. 2, an example of how a prior art textual debugger may be utilized is shown. Shown is the textual source code for an application program that prints the numbers 1–9 to a computer screen. Line 1 of the textual source code sets the integer variable "X" to 1. Line 2 of the textual source code is a "while-loop" statement, which causes the program to loop and perform the instructions within such a loop as long as variable X is less than 10. Lines 3 and 6 of the textual source code are brackets which indicate that the instructions contained within those brackets are associated with the while-loop statement. Line 4 of the textual source code is a statement to print the value of variable X to the screen. Line 6 of the textual source code is a statement that increments the value of X by 1. Therefore, the textual source code is for a program that prints the value of X from 1 to 9.

An example of a breakpoint being set at line 2 of the textual source code is also illustrated in FIG. 2. Such a breakpoint would typically be set by a programmer selecting line 2 of the textual source code and clicking an appropriate menu button or pressing a "hot-key" combination (e.g., "alt-F7"). Alternatively, a programmer may choose to set a breakpoint by choosing the appropriate menu option or pressing the appropriate "hot-key" combination for the debugging program, and thereafter the debugging program may prompt the programmer to provide the line number in the textual source code at which the programmer wishes to have the breakpoint set, such as line 2. As also illustrated by FIG. 2, once the programmer sets a breakpoint for line 2 of the textual source code, that line of the source code may be highlighted in some fashion to indicate that a breakpoint has been set at that point in the source code. Therefore, as the example in FIG. 2 demonstrates, a programmer utilizing this prior art debugging tool must be intimately familiar with the textual source code of an application program in order to understand where to effectively set debugging tools, such as breakpoints, within the textual source code. When working with more complex programs, the task of being intimately familiar with the textual source code and interacting with the textual source code to perform debugging becomes increasingly more difficult.

Figure 4:
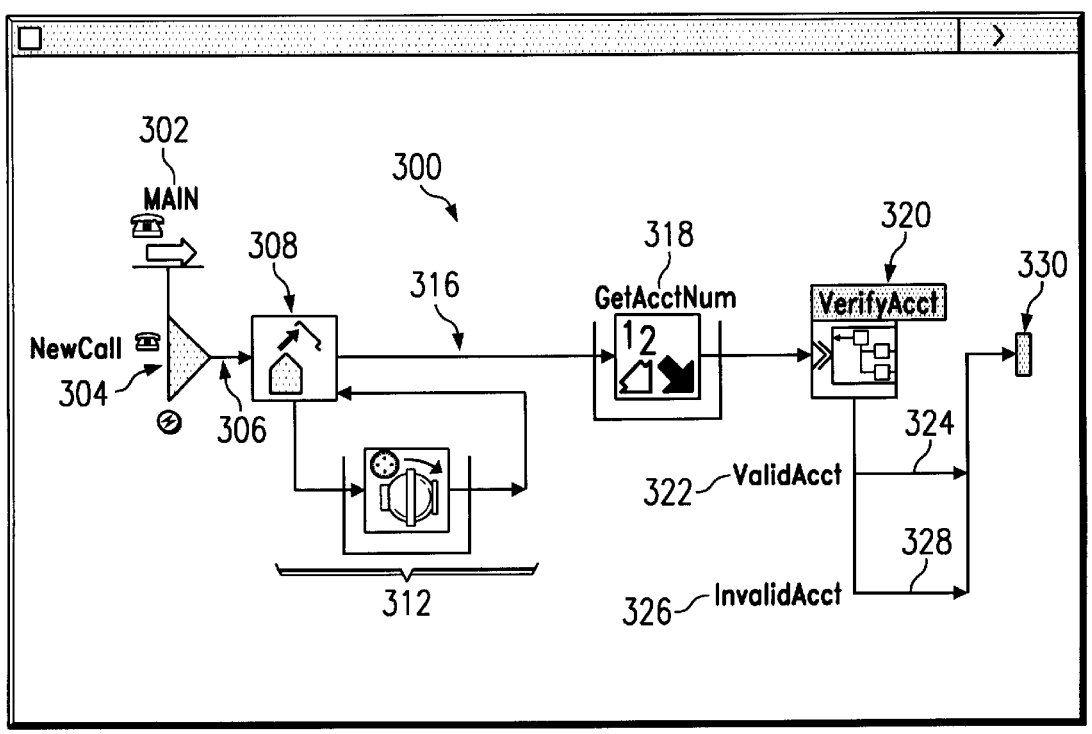
FIG. 4 illustrates an example of a graphical development environment having a graphical representation of a computer application.

FIGS. 3 and 4 illustrate examples of a graphical development environment. FIGS. 3 and 4 illustrate exemplary screens that may be presented to a developer when designing a call flow. An example of such a graphical development environment is provided in co-pending, commonly assigned U.S. application Ser. No. 08/599,134 filed Feb. 9, 1996, entitled "ENHANCED GRAPHICAL DEVELOPMENT ENVIRONMENT FOR CONTROLLING PROGRAM FLOW." In a preferred embodiment, the graphical debugging environment is utilized to debug application programs developed in a graphical development environment as that disclosed in "ENHANCED GRAPHICAL DEVELOPMENT ENVIRONMENT FOR CONTROLLING PROGRAM FLOW." However, the graphical debugging environment may be implemented to graphically debug application programs developed in any development environment, including environments other than those disclosed in "ENHANCED GRAPHICAL DEVELOPMENT ENVIRONMENT FOR CONTROLLING PROGRAM FLOW," and any such implementation is intended to be within the scope of the present invention.

The screens shown in FIGS. 3 and 4 may graphically represent application programs that reside (i.e., are stored) either locally or at some remote location. Such screens may also graphically represent application programs that are currently running (i.e., executing) either locally or at a remote location, or they may represent programs that are not currently running. Focusing on FIG. 3, the program represented graphically in FIG. 3 is functionally identical to the program represented textually in FIG. 2. The program (or "call flow") comprises an icon 32 that graphically represents the function of setting the variable "X" to 1. An arrow extends from icon 32 to icon 34, which represents the direction of the call flow. Icon 34 graphically represents a "while loop," which causes the program to loop, shown as loop 40, and perform the instructions within such loop as long as variable X is less than 10. Within loop 40 is icon 36, which graphically represents the function of printing the value of variable X to the screen. Also within loop 40 is icon 38, which graphically represents incrementing the value of variable X by 1. Thus, FIG. 3 is a graphical representation of a program that prints the value of X from 1 to 9.

Focusing now on FIG. 4, an exemplary graphical development environment is shown for a call flow diagram 300. Call flow diagram 300, in turn, comprises an icon 302, identifying it as the main routine. Call flow diagram 300 also includes an icon 304 representing a new call. A call answer icon 308 is also included in call flow diagram 300. An arrow 306 extends from new call icon 304 to call answer icon 308 and represents the direction of the call flow. The functionality represented by call answer icon 308 loops until it receives caller input. This loop is represented by loop and icon 312, which is attached to call answer icon 308. In addition, the developer has included an ask for account number icon 318, which requests an account number from a caller. Arrow 316 extends from call answer icon 308 to icon 318 and represents the direction of the call flow.

A verify account icon 320 having multiple returns 322 and 326 is also included in call flow diagram 300. The verify account subroutine has two possible return values: valid account and invalid account. Valid account is represented by label 322 and arrow 324, while invalid account is represented by label 326 and arrow 328. Icon 330 represents the end of the call. Thus, call flow diagram 300 is an example of a graphical development environment in which a computer application is represented graphically. It should be understood that an application program need not be represented exactly as shown in FIGS. 3 and 4. Rather, an application may be represented in any manner, and the graphical debugger disclosed herein may be implemented to debug any manner of graphical representation.

The example shown in FIG. 4 illustrates an application for receiving a new telephone call, receiving an account number, attempting to verify the account number, and then ending the call. Such a graphical representation may provide a much more user-friendly representation of the application than a textual representation (i.e., the underlying textual source code for the application). Each icon displayed represents underlying textual source code that is responsible for causing the computer to perform the function(s) represented by such icon. It may be possible for a program developer to view the actual source code underlying a particular icon, such as by double-clicking on a particular icon. Moreover, any given icon may have one or more underlying icons representing the underlying source code. For example, the Verify Account icon 320 shown in FIG. 4 may have several underlying icons that represent the steps necessary to perform the function of verifying an account. A developer may be able to view the icons underlying a particular icon, such as by double-clicking on the icon.

Obviously, the applications shown in FIGS. 3 and 4 could be much more complex (e.g., the application in FIG. 4 could allow a caller to perform other tasks after verifying the account number, such as reviewing an account balance). Also, the source code may be represented differently than shown in FIGS. 3 and 4. For example, different icons may be used to represent each function shown in FIGS. 3 and 4. It should again be noted that the graphical development environment may also be used to display non-telephony applications graphically, and the graphical debugger disclosed herein is also not limited to only debugging telephony applications.

Figure 5:
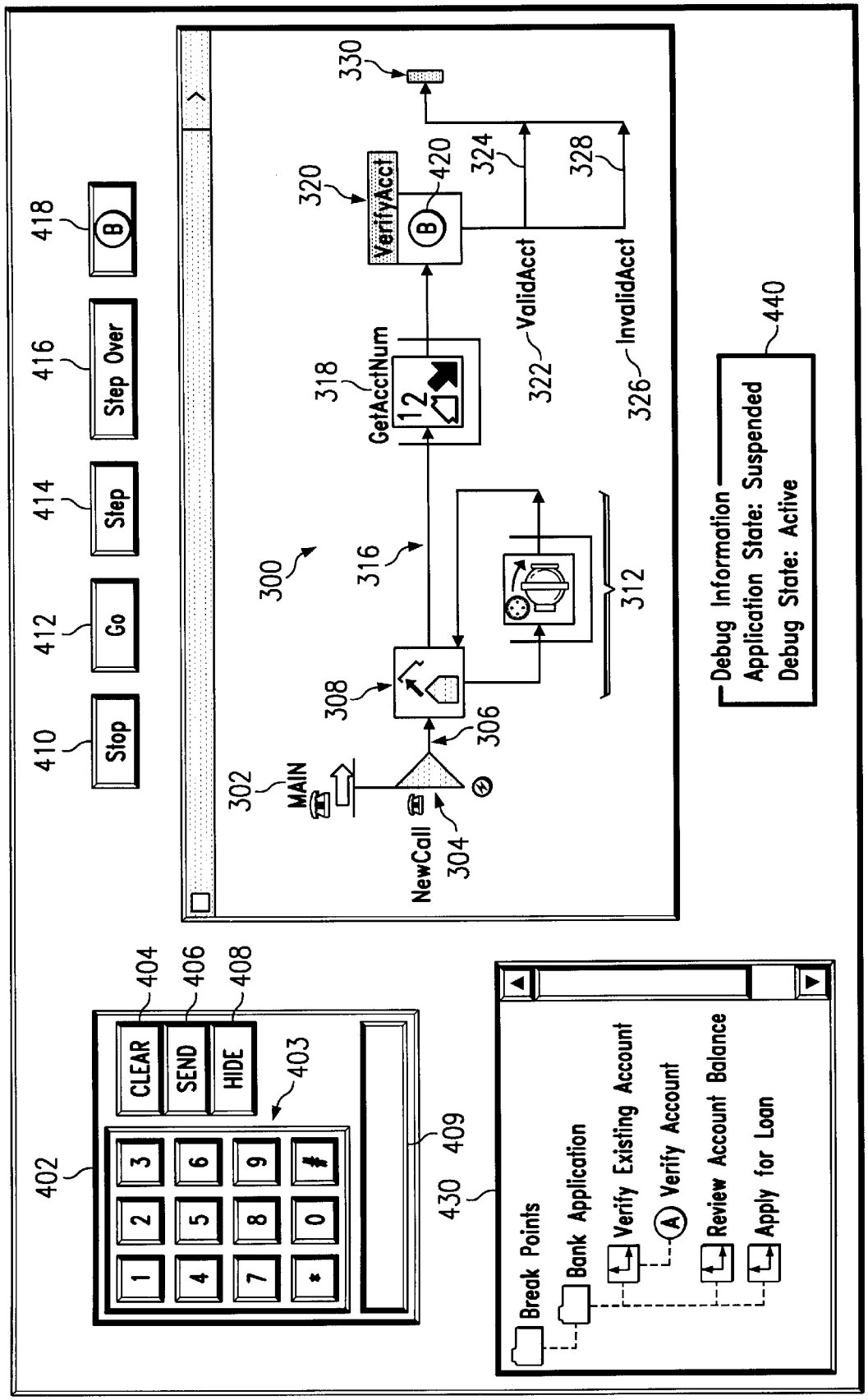
FIG. 5 illustrates an example of a graphical debugging environment for debugging a computer application.

Turning to FIG. 5, an exemplary graphical debugging environment is shown. Call flow diagram 300, as discussed above with reference to FIG. 4, is shown. The graphical debugging environment is capable of displaying a graphical representation of an application program much like a graphical development environment. Additionally, various testing and debugging tools 402-418 that may be offered to a developer in such a graphical debugging environment are illustrated. The function of each testing and debugging tool will be discussed in greater detail hereafter. It is important to realize at this point that debugging tools may be utilized within the graphical debugging environment without requiring a programmer to interact with the underlying textual source code of an application program. That is, debugging tools may be utilized by a programmer to debug an application at the graphical representation level, rather than at the lower textual source code level. Accordingly, the graphical debugging environment allows a programmer to utilize graphical debugging tools to perform highlevel debugging.

It should be understood that additional debugging tools not shown or discussed herein may be incorporated into the graphical debugging environment, and such debugging tools are intended to be within the scope of the present invention. That is, a debugging tool having any functional operation now known or later discovered may be incorporated into the graphical debugging environment and allow a developer to insert such a debugging tool into a graphical representation of an application program. Any such implementation is intended to be within the scope of the present invention.

One debugging tool that may be available in the graphical debugging environment is a breakpoint. A breakpoint may suspend an application program (i.e., make the application program stop advancing) or perform some other debug function whenever a certain point in the application program is reached, After the application is suspended a developer may analyze the states of various components of the application program, such as the value of variables used in the program. A developer may even have the capability to modify values stored in variables, while the application program is suspended. Breakpoints are one of the primary debug tools commonly utilized by developers in debugging application programs. Much of the embodiments disclosed herein will be explained in conjunction with the breakpoint debugging tool. However, it should be understood that other types of debugging tools may be implemented within the inventive graphical debugger as well, and any now known or later discovered debugging tools are intended to be within the scope of the present invention. Many types of breakpoints may be set by a developer to debug a program. System breakpoints, user breakpoints, and trigger breakpoints are three examples of the types of breakpoints that may be utilized by a developer to debug a program.

"System breakpoints" may be utilized by developers to cause the application program to be suspended upon the occurrence of a particular system function. For example, in the case of a VRU telephony application, a "cleanup breakpoint" may fire upon the termination of a telephone call to the system, such as the telephone call ending or being transferred. An "application start breakpoint" may fire when the application program executes to answer an incoming telephone call. A "LineSignal breakpoint" may fire when particular touch tones entered by a caller match a predefined Dual Tone Multi-Frequency ("DTMF") signal. Other types of system breakpoints may be utilized as well. It should be understood that system breakpoints are not limited to telephony applications, and system breakpoints utilized for nontelephony applications are intended to be within the scope of the present invention. Any type of system breakpoint now known or later discovered may be implemented within the inventive graphical debugging environment, and all such breakpoints are intended to be within the scope of the present invention.

"User breakpoints" are inserted by a developer within a particular location of the application program. For example, a user breakpoint may be inserted within a graphical representation of the application program at a particular graphical icon. An example of such a user breakpoint is shown in FIG. 5, wherein the breakpoint is indicated graphically by breakpoint indicator 420, which is inserted at graphical icon 320. There are various types of user breakpoints that may be available to a developer. Any type of user breakpoint now known or later discovered may be implemented within the inventive graphical debugging environment, and all such breakpoints are intended to be within the scope of the present invention.

One type of user breakpoint is a conditional breakpoint. A conditional breakpoint evaluates a condition (e.g., variable X=2) when such a breakpoint is encountered, and only when the result of the condition is true is the application program suspended. For example, suppose a VRU application program for a bank allows a customer of the bank to access the customer's checking account (e.g., by pressing 1 on the customer's telephone keypad). A developer may want to suspend the application program only after a particular customer's account is located. The developer may utilize a conditional breakpoint by inserting such a breakpoint on the graphical icon that represents the function of searching through the bank's database to find a particular customer's account. Obviously, a developer may not want to step through the program's operation of searching through each record in the database, but may want to suspend the program only after a particular customer's record is located. Accordingly, a condition such as "customer_name=Joe Customer" may be set for the conditional breakpoint, which will cause the application program to be suspended only when the variable "customer_name" contains the name "Joe Customer."

A system breakpoint or a user breakpoint may be defined as a "trigger breakpoint." That is, a trigger breakpoint is an attribute that may be applied to either system or user breakpoints. A trigger breakpoint suspends an application on a single line when the first occurrence of the breakpoint is encountered. Once a trigger breakpoint is encountered all other trigger breakpoints are removed, and all other breakpoints and/or other debugging tools may be activated. Thus, a trigger breakpoint may "trigger" a debug session by activating all set debugging tools when a designated breakpoint is encountered (i.e., fires). Using the above-example of a conditional breakpoint that fires when the variable "customer_name" contains the name "Joe Customer," if such a breakpoint is set as a trigger breakpoint all other debug tools set will be activated upon the trigger breakpoint firing (i.e., the variable "customer_name" contains the name "Joe Customer"). Such a breakpoint may be useful in allowing normal operation of a program until a particular condition occurs, wherein all debug tools become active (i.e., are triggered).

Breakpoints, including both system breakpoints and user breakpoints, may be set as reoccurring breakpoints or as single occurrence breakpoints. That is, a reoccurring breakpoint may be set within an application program until removed or disabled by a developer. A single occurrence breakpoint may be automatically disabled or removed from the application program after being fired once. Additionally, a developer may specify a limited number of occurrences for a breakpoint. For example, a developer may specify that a particular breakpoint is to only fire 3 times. Thereafter, the debugging program may keep track of how many times that breakpoint has fired and automatically disable or remove the breakpoint upon its third firing. Furthermore, a breakpoint may be set that causes all other breakpoints to be removed or disabled upon this breakpoint firing. It should be understood that any now known or later discovered type of breakpoints may be implemented within the inventive graphical debugger, and all such breakpoints are intended to be within the scope of the present invention.

Once a breakpoint is set within a call flow, it may be either enabled or disabled. If the breakpoint is enabled, it will fire when appropriate to do so. If the breakpoint is disabled, it will not fire (i.e., it is ignored). Accordingly, a developer may disable a breakpoint to analyze the operation of an application program without having the breakpoint fire. By disabling a breakpoint rather than completely removing (or deleting) it from the call flow, a developer may easily re-enable the breakpoint without having to insert a completely new breakpoint into the call flow. For example, by merely disabling a conditional breakpoint, a developer may re-enable the conditional breakpoint without having to insert a new breakpoint into the call flow and recreate the associated condition for the breakpoint.

Graphical breakpoints may be set in a variety of ways. For example, a graphical breakpoint may be set by selecting an icon within the call flow diagram and then pressing "hot keys" (e.g., pressing alt-B-P, or pressing shift and right clicking the mouse) or clicking a graphical button (e.g., button 418 in FIG. 5) to set and enable a breakpoint at that point of the call flow diagram. For example, as shown by FIG. 5, a developer may select the "VerifyAcct" icon 320, and through pressing a hot key combination or clicking on a graphical button, such as button 418, the developer may insert a breakpoint directly into that selected icon. Thus, it can be seen that a developer may insert a breakpoint or other debugging tool directly into the graphical representation of the application program 300, without being required to interact with the underlying textual source code. Once a breakpoint or other debug tool is set, it may be represented graphically, as is illustrated in FIG. 5 by breakpoint indicator 420.

Figure 6:
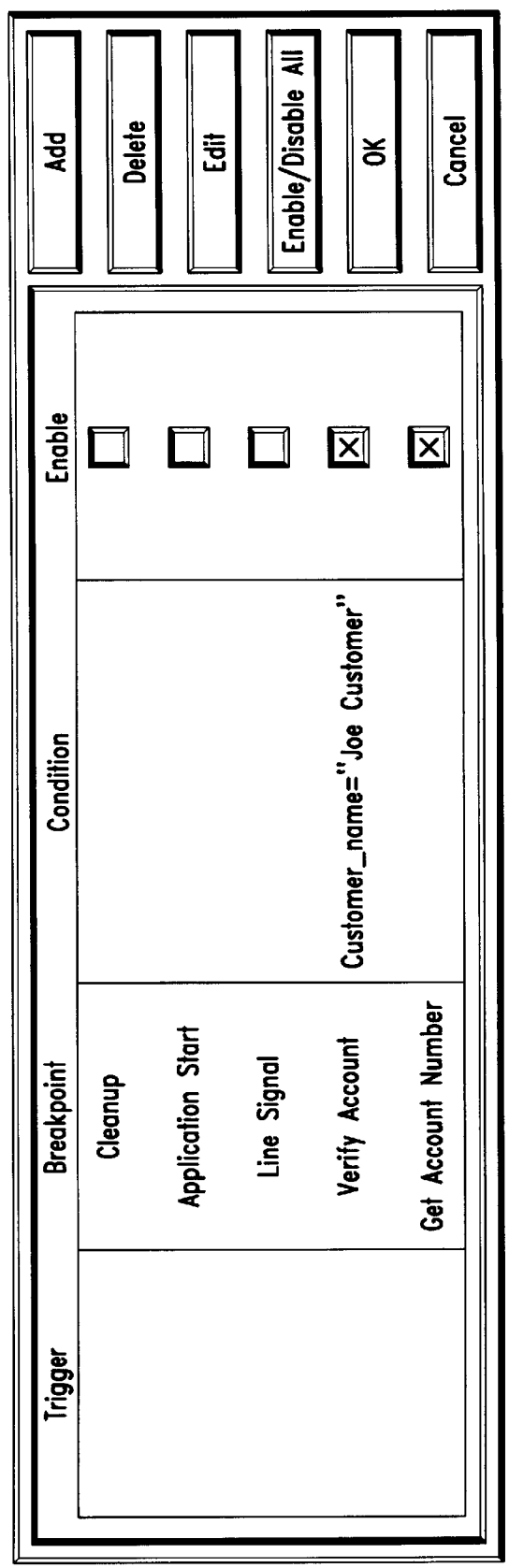
FIG. 6 illustrates an exemplary display for interacting with breakpoints for debugging a computer application.

A window or other type of display may be provided within the debugging environment similar to that shown in FIG. 6. Such a display may be implemented within the graphical debugging environment in a number of ways, such as a separate window or as a sliding subcanvas on the call flow diagram panel. Such a display may provide the current breakpoints and allow a developer to interact with the breakpoints, such as adding a breakpoint, deleting a breakpoint, or editing a breakpoint. As shown, 5 breakpoints are currently set for the application program. The first 3 shown are system breakpoints, which are not enabled. Accordingly, such breakpoints will not fire as the application program executes. As also shown, a conditional breakpoint is set for the "Verify Acct" icon. Additionally, the corresponding condition currently set for that breakpoint is displayed (i.e., customer_name="Joe Customer"). The other 4 displayed breakpoints are not conditional breakpoints as is apparent by the fact that no corresponding condition is shown. Alternatively, rather than displaying nothing in the condition column for unconditional breakpoints, a signal, such as the word "true" may be displayed to indicate that the breakpoint will fire unconditionally when encountered.

As FIG. 6 also illustrates, a user breakpoint is set for the "Get Acct Num" icon. The user breakpoints set for the "Verify Acct" and "Get Acct Num" icons are currently enabled, as illustrated by the corresponding "Enable" boxes. Also as illustrated, none of the set breakpoints are trigger breakpoints, which is indicated by the "Trigger" column being blank for each breakpoint. If one of the breakpoints were to be set as a trigger breakpoint, an indication would be provided in the "Trigger" column, such as by displaying the word "true" in the "Trigger" column for the breakpoint. A developer may enable or disable a breakpoint by clicking on the corresponding "Enable" box. Moreover, a developer may enable or disable all of the breakpoints set by activating the "Enable/Disable ALL" button.

Furthermore, a developer may utilize the "Add" button to set a new breakpoint directly from this display. For example, activating the "Add" button may prompt the user to provide the name of the icon for which the breakpoint should be set and any conditions that should be associated with such breakpoint. A developer may utilize the "Delete" button to remove any selected breakpoint(s) from the application program. Thus, a developer may select one or more of the breakpoints, such as by clicking on them, and then activate the "Delete" button to remove such selected breakpoint(s). Additionally, a developer may edit existing breakpoints by activating the "Edit" button. For example, a developer may select a breakpoint to edit and then activate the "Edit" button. Thereafter, the developer may edit a condition associated with the selected breakpoint or perform other editing functions. A developer may copy conditions from one breakpoint and paste or insert those conditions for other breakpoints. Selecting the "OK" button will activate any changes made to the breakpoints, and selecting the "Cancel" button will cancel the latest changes made to the breakpoints and return the breakpoint settings back to the states that they had prior to the developer editing within this display.

The display shown in FIG. 6 may be implemented in various ways and need not be displayed only as shown in FIG. 6. Moreover, a similar display may be utilized to view and interact with other debugging tools as well, and is not limited to only breakpoints. The present invention is intended to encompass any such display for displaying and/or interacting with debugging tools. The graphical debugging environment may be implemented without such a display at all, and any such debugging environment not having such a display is also intended to be within the scope of the present invention.

Even though much of the embodiments disclosed herein are discussed in conjunction with the breakpoint debugging tool, it should be understood that other types of debugging tools may be implemented within the inventive graphical debugger in a similar fashion, and any now known or later discovered debugging tools are intended to be within the scope of the present invention. An example of another such debugging tool that may be incorporated within the graphical debugging environment is a watchpoint. A watchpoint is a special type of breakpoint, which suspends the application program when the value of an expression changes.

A preferred embodiment of the graphical debugger may provide a developer with the options of Stop, Go, Step, Step Over, as well as other tools. Turning back to FIG. 5, Stop 410 is provided within the graphical debug environment. Stop 410, when activated, may halt execution of the application program currently being debugged. Go 412 is also provided within the graphical debug environment. Go 412, when activated, may start (or resume) execution of the application program currently being debugged.

Step 414 is provided within the graphical debug environment. Step 414 may allow a developer to step through execution of the application program. For example, once a breakpoint fires to suspend execution of the application program, a developer may use Step 414 to step through the application program's execution. Accordingly, the application program may advance one icon (or one "block" of source code) each time that the developer activates Step 414. As a developer steps through each icon of a program the icon currently being executed may be highlighted or indicated in some other fashion to allow a developer to monitor the progress of the program's execution.

Step Over 416 is also shown in FIG. 5. Step Over 416 may allow a developer to step from an icon (or "block" of source code) displayed on one level of the call flow to the next icon (or "block" of source code) displayed on the same level by stepping over all of the icons (or "blocks" of source code) on underlying levels of the call flow. For example, suppose a breakpoint is set at a graphical icon that contains several underlying icons. Once the breakpoint fires the application's execution will be suspended. A developer may use Step 414 to step through the execution of each graphical icon, including each underlying graphical icon. However, a developer may use Step Over 416 to advance the program's execution to the next graphical icon on the same level as the icon for which the breakpoint was set. Thus, Step Over 416 allows the application program to perform all of the underlying icons uninterrupted, and then suspend the application at the next icon at the same level as the icon for which the breakpoint was set. Again, the icon currently being executed may be highlighted or otherwise indicated to allow a developer to monitor the progress of the program's execution.

A preferred embodiment of the graphical debugger may provide a developer with a Touch Tone telephone keypad 402. Such a Touch Tone telephone keypad 402 may be available as a sliding subcanvas on the call flow diagram panel, and it may be used to simulate DTMF inputs for an application. Accordingly, Touch Tone telephone keypad 402 may allow a developer to test a telephony application by simulating DTMF inputs for the application. It should be understood that such a keypad may be unnecessary for developers debugging non-telephony applications, and such a feature of the graphical debugger may be omitted without affecting the remaining debugging tools or the overall invention.

Touch Tone telephone keypad 402 may include a telephone keypad 403, a clear button 404, a send button 406, a hide button 408, and a display window 409. A developer may use telephone keypad 403 to simulate traditional keypad strokes in an application. The buttons pressed on telephone keypad 403 may be displayed on display window 409. For example, a developer may dial the numbers "2-1-3", and "213" may be displayed in display window 409. In other words, a keypad buffer may be maintained for the telephone keypad 403 buttons pressed. A developer may clear such a keypad buffer, which may in turn clear display window 409, by pressing the clear button 404. After desired telephone keypad 403 button(s) has been pressed, a developer may simulate the DTMF inputs for an application by pressing the Send button 406. That is, the send button 406 may send the desired DTMF string to an application. Accordingly, a developer may monitor how a telephony application reacts to receiving particular DTMF inputs. A hide button 408 may also be provided to allow a developer to close or "hide" Touch Tone telephone keypad 402.

A Start Call button may be provided in the preferred embodiment, which may allow a developer to simulate a Ring on the line to trigger a desired telephony application. Once a call is active the Debug session may have full functionality. At this point, a developer may set breakpoints, remove breakpoints, step through the application, resume normal operation of the application, or perform other debugging functions. If there is a host connection to an application that is running at a remote location, a real host screen can be sent and received via a network, such as network 108 shown in FIG. 1. A Stop Call button may be provided to hang up the telephone line.

A preferred embodiment of the graphical debugger may provide a developer with a "file folder" view of the debug tools currently set within an application, such as the file folder view 430 shown in FIG. 5. As shown in FIG. 5, a developer may view debug tools, such as breakpoints, that are set for an application. As shown, a breakpoint is set within the application program "Bankapp." The Bankapp program as shown has 3 call flow modules ("Verify Existing Acct," "Review Acct Balance," and "Apply for Loan"), and as the file folder view 430 illustrates, a breakpoint is set at the VerifyAcct icon within the Verify Existing Acct module. Such a folder view may provide a developer with a convenient indication of where debug tools are set within an application program.

Moreover, in a preferred embodiment, the graphical debugger is capable of debugging multiple application programs concurrently. That is, a developer may specify multiple application programs in which debug tools may be set, and the graphical debugger may debug the multiple application programs concurrently. In a preferred embodiment, the multiple application programs may be concurrently debugged during their runtimes without a developer being required to halt each application program in order to insert, remove, or modify debug tools for each program. Providing a file folder view 430 as shown in FIG. 5 may aid a developer in debugging multiple application programs concurrently.

It should be understood that information regarding where debug tools are currently set within one or more application programs may be implemented in any manner and need not be displayed as the file folders shown in FIG. 5. Any manner may be used to display the same information. Furthermore, it should be understood that such a feature of the graphical debugger may be omitted without affecting the remaining debugging tools or the overall invention. Thus, it is not necessary to the graphical debugging environment that such a view of the debug tools currently set within an application be provided, and a graphical debugger that does not provide such a view is intended to be within the scope of the present invention.

A preferred embodiment of the graphical debugger displays other related "debug information," such as shown in box 440 in FIG. 5. Such debug information may provide the current state of the application program, such as suspended, halted, or executing. The debug information may also provide the current state of the debugger, such as active or inactive. It should be understood that such debug information may be implemented in any manner and need not be displayed as shown in FIG. 5. Furthermore, it should be understood that such a feature of the graphical debugger may be omitted without affecting the remaining debugging tools or the overall invention. Thus, it is not necessary to the disclosed invention that such debug information be provided within a graphical development environment, and a graphical debugger that does not provide such debug information is intended to be within the scope of the present invention.

Additional information may be available within the graphical debugging environment. For example, a window may be provided that displays the textual source code of an application program as the program is being debugged. Such a window may allow a developer to view the textual source code of an application program as the developer steps through the program's operation. Thus, textual source code may be displayed in addition to the graphical representation of the application program.

Turning back now to FIG. 1, in a preferred embodiment of the present invention, the graphical debugging program is executed locally, such as on computer system $100_{LOCAL}$. Further, in a preferred embodiment, an application program to be debugged may be stored either locally, such as on computer system $100_{LOCAL}$, or remotely, such as on computer system $100_{REMOTE}$. If the application program is stored remotely at system $100_{REMOTE}$, a graphical representation of the application program may be retrieved via network 108 and displayed locally at computer system $100_{LOCAL}$. Thereafter, the application program may be debugged utilizing the graphical debugging environment running locally on computer system $100_{LOCAL}$. That is, the graphical debugging program may be utilized locally at computer system $100_{LOCAL}$ to insert debug tools, such as breakpoints, for the remote application program.

Moreover, in a preferred embodiment, the graphical debugging environment allows a developer to debug an application program during the application's runtime. Accordingly, a developer is not required to halt the application program prior to inserting debug tools into the application, removing debug tools from the application, or modifying attributes of debug tools in the application. Debugging the application program at runtime may be accomplished in various ways. In a preferred embodiment, a debug engine is utilized to recognize debug tools and perform the associated debug function at the appropriate location within the application program. Such a debug engine may be operating locally to allow a local program to be debugged during runtime, or the debug engine may be operating remotely to allow a remote program to be debugged during runtime. In a preferred embodiment, such a debug engine is utilized to debug InVision™ application programs. However, the graphical debugger and debug engine may be implemented for programs developed by other programming languages as well, and any such implementation is intended to be within the scope of the present invention.

In a preferred embodiment, the source code of an application program is grouped into blocks, and each block is capable of being represented graphically by an icon. Furthermore, each block is assigned a "block ID," which identifies that particular block of source code. As an application program executes, it creates a "dynamic dictionary" or dynamic list of entry points for each block of the application's source code. The debug engine is capable of suspending the application's execution at any given entry point in order to insert a desired debug tool at such an entry point. In this manner, the application program may be debugged during its runtime.

Figure 7:
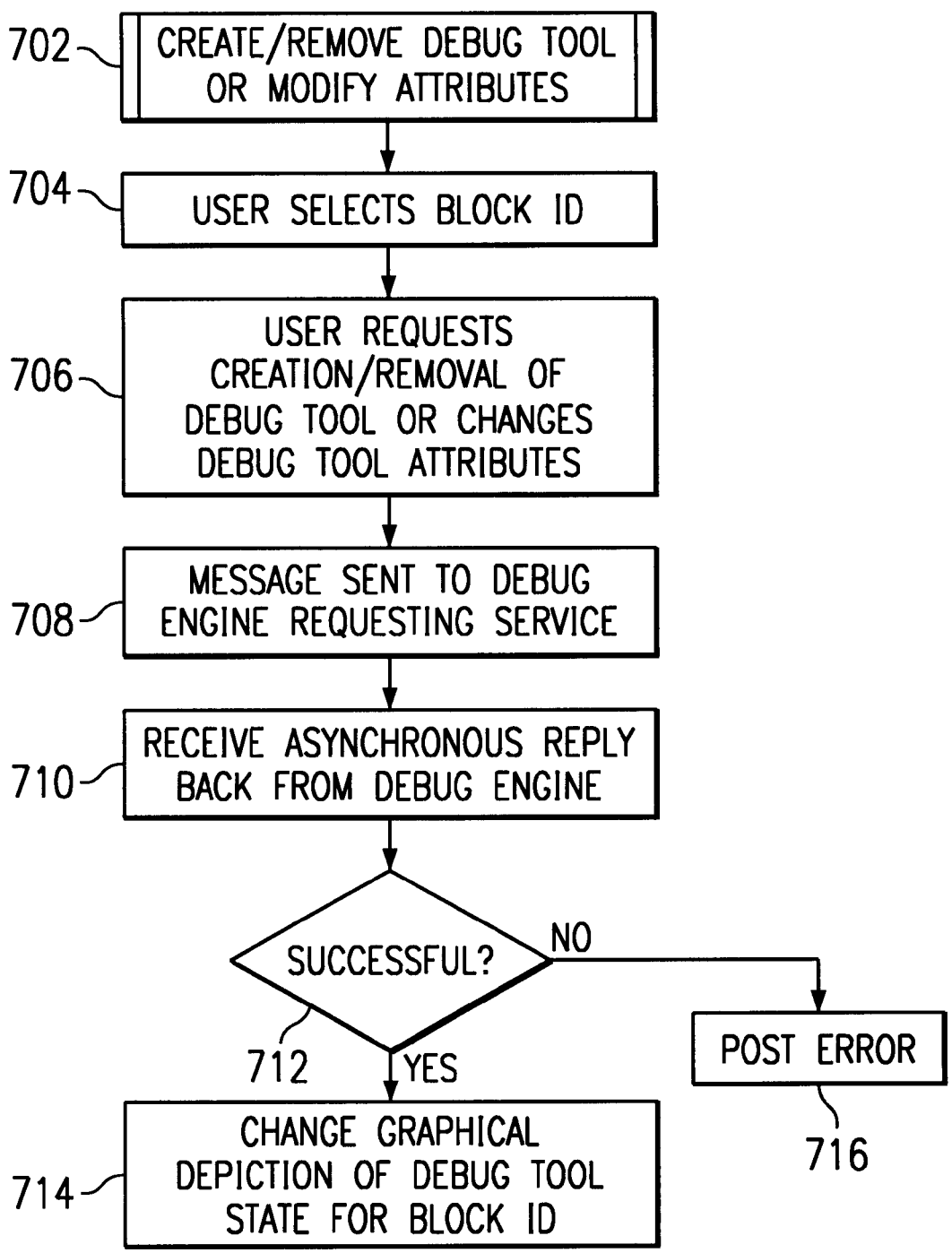
FIG. 7 illustrates a flow diagram for the operation of a preferred embodiment of a graphical debugger for creating/removing debug tools and modifying attributes of a debug tool.
Figure 8:
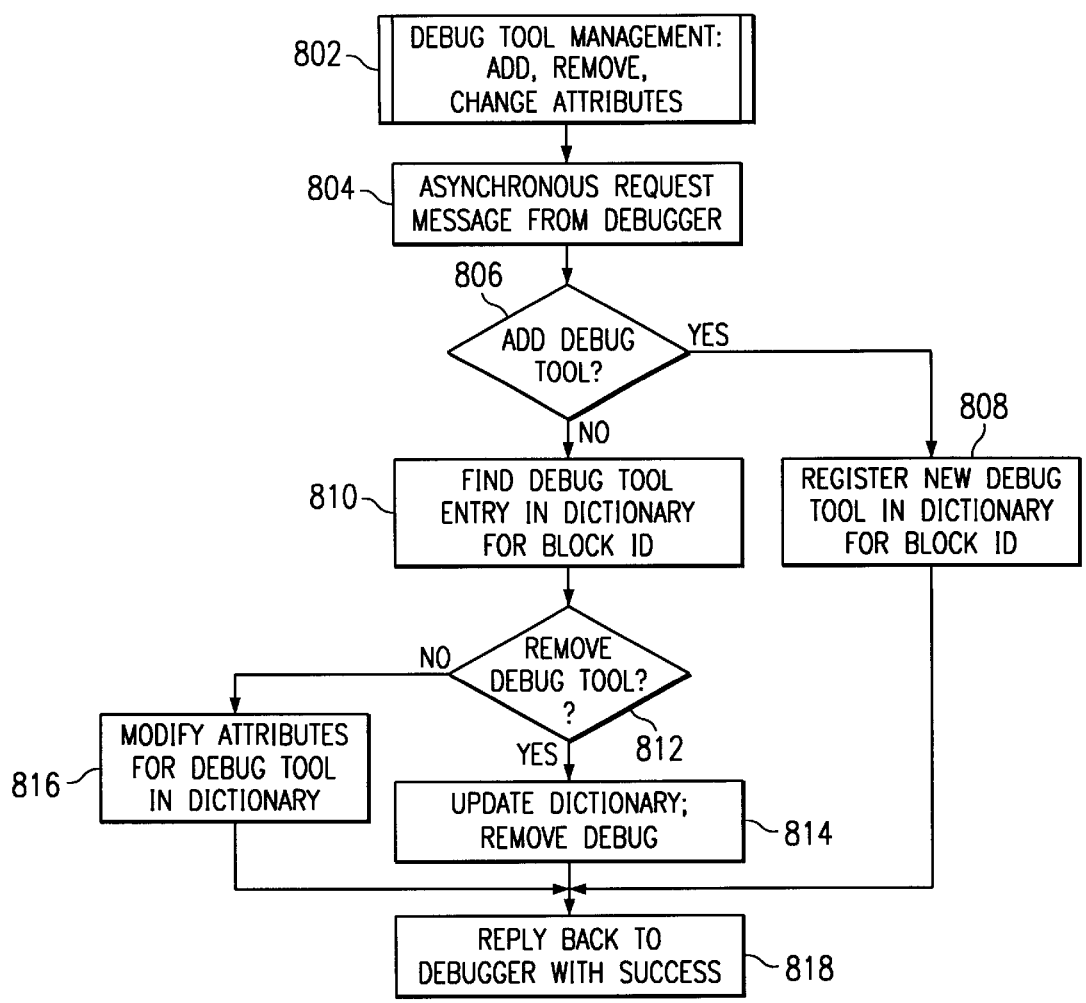
FIG. 8 illustrates a flow diagram for the interaction between a graphical debugger (the debug tool management) and a debug engine in a preferred embodiment.

Turning to FIGS. 7, 8 and 9, exemplary flow diagrams for the above-described method of runtime debugging are shown. FIG. 7 shows an exemplary flow diagram for steps that may be performed by the graphical debugger in debugging an application at runtime. More specifically, FIG. 7 shows a flow diagram for steps that may be performed in a preferred embodiment by the graphical debugger in creating/removing a debug tool and modifying attributes of a debug tool. Accordingly, a developer may create or add a desired debug tool to an application program. Also, a developer may remove existing debug tools from an application program. Additionally, a developer may modify the attributes of an existing debug tool. The attributes of a debug tool may comprise a debug tool's state, such as enabled/disabled, conditions that may be associated with a debug tool, such as "customer_name=Joe Customer," and other characteristics of a debug tool.

The flow diagram for creating/removing a debug tool or modifying attributes of a debug tool begins at block 702. A user may select the Block ID at which a debug tool is to be inserted, removed, or modified at block 704. For example, a user may select a desired Block ID by clicking on the icon that graphically represents such Block ID. Once a Block ID has been selected, the user requests to have a debug tool inserted, removed, or modified for the selected Block ID. For example, a developer may select a particular icon and insert a breakpoint as shown in FIG. 5, and the developer's request for a breakpoint at that particular icon's block ID is received by the graphical debugger. Thereafter, the graphical debugger communicates the requested service (i.e., inserting/removing/modifying a debug tool) to the Debug Engine at block 708.

The graphical debugger then receives a reply back from the debug engine at block 710. In a preferred embodiment, such reply is asynchronous to requests being issued by the graphical debugger. That is, additional requests can be issued by the graphical debugger to the debug engine before a reply is received by the graphical debugger from the debug engine for a previous request. Thus, in a preferred embodiment the graphical debugger is not required to await a reply from the debug engine for one request before issuing another request to the debug engine. Additionally, in a preferred embodiment, unsolicited information can be received by the graphical debugger before receiving the reply from the debug engine at block 710. For example, the graphical debugger may receive a message that a breakpoint has fired for another application being debugged before receiving a reply at block 710.

Once the reply is received at block 710, the graphical debugger then determines whether the reply indicates that the requested service was successful at block 712. That is, the graphical debugger determines whether the request to insert, remove, or modify a debug tool was successful. If the requested service was successful, the graphical debugger makes any necessary graphical changes to the call flow representation and other information provided by the graphical debugger to depict the updated debug tool state for the Block ID at block 714. For example, if the requested service was to add a breakpoint at the selected Block ID, a graphical representation of the added breakpoint may be inserted in the graphical representation of the call flow. This example is illustrated in FIG. 5, in which a graphical representation of a breakpoint 420 is included in the call flow for the selected icon 320. If at block 712 the graphical debugger determines that the requested service was unsuccessful, the graphical debugger posts an error at block 716 to notify the developer that the requested service was unsuccessful.

Turning now to FIG. 8, an exemplary flow diagram illustrating the interaction between the debug engine and the graphical debugger in conducting debug tool management (e.g., inserting a debug tool, removing a debug tool, and changing attributes of a debug tool) is provided. The flow diagram begins at block 802. At block 804, the debug engine receives a request from the graphical debugger requesting a service, such as inserting a debug tool, removing a debug tool, or changing the attributes of a debug tool. In a preferred embodiment, such request is asynchronous to replies being issued by the debug engine. That is, additional requests can be issued by the graphical debugger to the debug engine before a reply is received by the graphical debugger from the debug engine for a previous request. At block 806, the debug engine determines whether the request is a request to add (or insert) a debug tool. If the debug engine determines that the request is a request to add a debug tool, the debug engine registers the new debug tool in the Dictionary for the selected Block ID at block 808. Thus, at block 808, the dynamic Dictionary is updated with the new debug tool for the selected Block ID. Thereafter, the debug engine replies back to the graphical debugger with a "success" message at block 818.

If at block 806 the debug engine determines that the request is not a request to add a new debug tool, the debug engine searches the Dictionary and finds a debug tool entry for the selected Block ID at block 810. At block 812, the debug engine determines whether the request is a request to remove an existing debug tool from the selected Block ID. If the debug engine determines that the request is a request to remove an existing debug tool from the selected Block ID, then the debug engine updates the Dictionary by removing the selected debug tool from the dictionary at block 814. Thereafter, the debug engine replies back to the graphical debugger with a "success" message at block 818.

If at block 812 the debug engine determines that the request is not a request to remove an existing debug tool, then the debug engine modifies the attributes for the debug tool in the dictionary at block 816. That is, the debug engine modifies the attributes for the selected debug tool in the dynamic dictionary as specified by the developer at block 816. For example, the debug tool may have its state changed from enabled to disabled, or an associated condition for the debug tool may be modified. Thereafter, the debug engine replies back to the graphical debugger with a "success" message at block 818.

Turning now to FIG. 9, an exemplary flow diagram for the execution of the debug engine in a preferred embodiment is illustrated. As shown, the execution of the application program may start at block 902. At block 906, the debug engine processes the Block ID being executed by the application program. That is, the debug engine identifies the Block ID for the block of source code being executed by the application program. At block 908, the debug engine determines whether a debug tool is available at the identified Block ID. Such determination may be made by reading information contained in the dynamic Dictionary. For example, the debug engine may determine whether a breakpoint or other type of debug tool has been added at the identified Block ID by determining whether the identified Block ID is provided within the dynamic Dictionary with an associated debug tool. If a debug tool is not available at the identified Block ID, the debug engine waits for the application program's execution to advance to the next Block ID at block 904.

If a debug tool is available at the identified Block ID, the debug engine may then determine whether the debug tool is enabled at block 910. If the debug tool is not enabled, the debug engine advances to the next Block ID at block 904. However, if the debug tool is enabled, the debug engine determines whether the debug tool's condition is true at block 912. Such condition may be true by merely arriving at this point of the application program's execution, or the debug tool may have an associated condition, such as "customer_name=Joe Customer." If the debug engine determines at block 912 that the debug tool's condition is not true while executing this block, the debug engine waits for the application program's execution to advance to the next Block ID at block 904.

If the debug engine determines at block 912 that the debug tool's condition is true, the debug engine performs the debug tool's function at block 914. For example, for a breakpoint the debug engine may halt execution at block 914. At block 916 the debug engine sends a message to the graphical debugger that the debug tool's function has been performed. Thereafter, the debug engine may await the next request at block 918. For example, the debug engine may await a request to resume execution (i.e., Go), Step, Step Over, view the contents of variables used within the application program, or the debug engine may wait for input touch tones to be provided for a telephony application program.

It should be understood that the graphical debugging environment allows debug tools to be set for multiple block IDs within an application program. That is, the flow diagrams of FIGS. 7-9 are not limited to merely 1 debug tool being requested for an application program, but multiple debug tools may be requested within an application program. Accordingly, each debug tool requested by a developer may have an indicator displayed within the graphical representation of the application program and may be communicated to the debug engine.

Debugging an application program during runtime offers developers the ability to analyze the program's operation to detect and examine problems with the program without interrupting the program's operation. For example, suppose that a VRU application is running at a bank which allows the bank's customers to call the VRU and interact with the application by pressing touch tone keys on the customers' telephones or speaking verbal commands into the telephones. A customer may be able to press 1 to access the customer's savings account, press 2 to access the customer's checking account, press 3 to apply for a loan from the bank, and so on. Utilizing the graphical runtime debugger, a developer may view a graphical representation of the application program running on the bank's system. Thereafter, the developer may utilize various debug tools to analyze the application program's operation without interrupting the program's operation. Thus, bank customer's may continue to call the VRU and interact with the application while developers simultaneously debug the application. Accordingly, such debugging may be transparent to the customers that interact with the application while it is being debugged, assuming that the developer is not debugging a telephone line being used by a customer.

It should be understood that utilizing this method may allow debug tools to be inserted and removed from an application program during the application program's runtime. Accordingly, at the end of a debug session a developer may remove any or all of the debug tools inserted in the application program. When a developer requests to remove a debug tool during the application program's runtime, the graphical debugger may simply communicate such a request to the debug engine, and the debug engine may receive the request and remove such a debug tool.

An alternative technique for allowing runtime debugging may be utilized with an application program that compiles as it executes. That is, an application program may not compile a line of source code until it is about to execute that line. Accordingly, debug tools may be inserted into such a program without halting the program's operation. That is, because each line of source code is not compiled until just prior to its execution, a debug tool may be inserted in such a program without halting the program. The program will just compile and recognize any debug tools inserted at a particular line of source code as it is ready to execute that particular line.

Yet another alternative technique for allowing runtime debugging is to emulate the application program and perform debugging on the emulation. Because debugging is performed on the emulation, it is unnecessary to interrupt the operation of the actual application program. Thus, debugging of the emulation may be performed without interrupting the application program's execution.

Still another alternative technique for allowing runtime debugging is to simulate the application program and perform debugging on the simulation. Because debugging is performed on the simulation, it is unnecessary to interrupt the operation of the actual application program. Thus, debugging of the simulation may be performed without interrupting the application program's execution.

It should be understood that applications developed by particular programming languages may be required to be halted before inserting, removing, or modifying a debug tool. That is, certain application programs may not be debugged during runtime as discussed herein. It should be understood, however, that an embodiment of the graphical debugging system and method disclosed herein may still be utilized for such an application program to allow a developer the advantages of debugging such application program graphically, and any such embodiment is intended to be within the scope of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A graphical debugger for debugging a computer application program on a computer system having a display, comprising:

software code executable to represent a computer application program graphically on said display; and software code executable for interacting directly with said graphical representation of said computer application program to debug said computer application program, wherein user interaction with said computer application program's textual source code is not required.

2. The graphical debugger of claim 1, wherein said software code executable for interacting comprises software code executable for inserting a graphical debugging tool directly in said graphical representation, and wherein said graphical debugging tool is a breakpoint.

3. The graphical debugger of claim 1, wherein said software code executable for interacting comprises software code executable for inserting a graphical debugging tool directly in said graphical representation.

4. The graphical debugger of claim 3, wherein said software code executable for inserting a graphical debugging tool directly in said graphical representation comprises:

software code executable to represent an inserted graphical debugging tool graphically within said graphical representation of said computer application program, wherein a graphical indicator is displayed within said graphical representation of said computer application program to indicate said inserted graphical debugging tool.

5. The graphical debugger of claim 1, wherein said software code executable for interacting comprises software code executable for removing a graphical debugging tool directly from said graphical representation.

6. The graphical debugger of claim 1, wherein said software code executable for interacting comprises software code executable for modifying attributes of a debugging tool.

7. The graphical debugger of claim 1, wherein said computer application program resides on a computer system remote from said graphical debugger.

8. The graphical debugger of claim 1, wherein said software code executable to represent a computer application program graphically further comprises:

source code executable to divide the source code of said application program into blocks;

source code executable to represent each of said blocks by a graphical icon; and source code executable to display said graphical icons in a logical arrangement to represent a program flow.

9. The graphical debugger of claim 8, further comprising:

source code executable for selecting a graphical icon; and source code executable for inserting a debugging tool directly into said graphical representation of said computer application program at said selected graphical icon.

10. The graphical debugger of claim 9, further comprising:

source code executable for communicating said selected graphical icon to a debug engine, wherein said debug engine updates a dynamic dictionary of debug tools existing for said computer application program.

11. The graphical debugger of claim 8, further comprising:

source code executable for selecting an existing debugging tool; and source code executable for removing said existing debugging tool directly from said graphical representation of said computer application program.

12. The graphical debugger of claim 8, further comprising:

source code executable for selecting an existing debugging tool; and source code executable for modifying attributes of said existing debugging tool.

13. The graphical debugger of claim 1, wherein said software code executable to represent a computer application program graphically and said software code executable for interacting directly with said graphical representation of said computer application program to debug said computer application program are executable to graphically debug said computer application program while said computer application program is executing.

14. The graphical debugger of claim 1, wherein said computer application program is a telephony application program.

15. The graphical debugger of claim 1, further comprising:

software code executable to graphically debug multiple applications concurrently.

16. A method for graphically debugging a computer application program on a computer system having a display, comprising:

representing a computer application program graphically on said display; and interacting directly with said graphical representation of said computer application program to debug said computer application program, wherein user interaction with said computer application program's textual source code is not required.

17. The method of claim 16, wherein said interacting comprises inserting a graphical debugging tool directly in said graphical representation, and wherein said graphical debugging tool is a breakpoint.

18. The method of claim 16, wherein said interacting comprises inserting a graphical debugging tool directly in said graphical representation.

19. The method of claim 18, wherein said inserting a graphical debugging tool directly in said graphical representation comprises:

representing an inserted graphical debugging tool graphically within said graphical representation of said computer application program, wherein a graphical indicator is displayed within said graphical representation of said computer application program to indicate said inserted graphical debugging tool.

20. The method of claim 16, wherein said interacting further comprises removing a graphical debugging tool directly from said graphical representation.

21. The method of claim 16, wherein said interacting further comprises modifying an existing graphical debugging tool.

22. The method of claim 16, wherein said computer application program resides on a computer system remote from the graphical debugger program used to performed said steps of representing and interacting to debug said computer application program.

23. The method of claim 16, wherein said representing a computer application program graphically further comprises:

dividing the source code of said application program into blocks;

representing each of said blocks by a graphical icon; and displaying said graphical icons in a logical arrangement to represent a program flow.

24. The method of claim 23, further comprising:

selecting a graphical icon; and inserting a debugging tool directly into said graphical representation of said computer application program at said selected graphical icon.

25. The method of claim 24, further comprising:

communicating said selected graphical icon to a debug engine; and said debug engine updating a dynamic dictionary of debug tools existing for said computer application program.

26. The method of claim 16, wherein said computer application program is executing while said steps of representing and interacting are performed to graphically debug said computer application program.

27. The method of claim 16, wherein said computer application program is a telephony application program.

28. The method of claim 16, further comprising:

graphically debugging multiple ones of said computer application program concurrently.

29. A graphical debugging environment for execution on a computer system having a display, comprising:

means for graphically representing an application program on said display; and means for interacting directly with said graphical representation of said application program to debug said application program, wherein user interaction with said application program's textual source code is not required.

30. The graphical debugging environment of claim 29, wherein said means for interacting further comprises means selected from the group consisting of:

a means for inserting a graphical debugging tool directly in said graphical representation of said application program, a means for removing an existing graphical debugging tool directly from said graphical representation of said application program, and a means for modifying an existing graphical debugging tool.

31. The graphical debugging environment of claim 29, wherein said graphical representation of said application program represents said application program as a program flow.

32. The graphical debugging environment of claim 29, wherein said means for interacting further comprises means for inserting a debugging tool directly in said graphical representation of said application program, wherein said debugging tool is a breakpoint.

33. The graphical debugging environment of claim 29, wherein said means for interacting further comprises a means for removing a debugging tool directly from said graphical representation of said application program.

34. The graphical debugging environment of claim 29, wherein said application program is a telephony application program.

35. A computer program product having a computer readable medium having computer program logic recorded thereon for graphically debugging an application program, the computer program product comprising:

means for graphically representing an application program on a display means; and means for interacting directly with said graphical representation of said application program to debug said application program, wherein user interaction with said application program's textual source code is not required.

36. The computer program product of claim 35, wherein said means for interacting comprises means for inserting a graphical debugging tool directly in said graphical representation of said application program, wherein said graphical debugging tool is a breakpoint.

37. The computer program product of claim 35, wherein said means for interacting comprises a means selected from the group consisting of:

means for inserting a graphical debugging tool directly in said graphical representation of said application program, means for removing an existing graphical debugging tool directly from said graphical representation of said application program, and means for modifying an existing graphical debugging tool.

38. The computer program product of claim 35, wherein said application program to be debugged resides remote from said computer program product for graphically debugging said application program.

39. The computer program product of claim 35, wherein said means for graphically representing an application program on a display means further comprises:

means for dividing the source code of said application program into blocks;

means for representing each of said blocks by a graphical icon; and means for displaying said graphical icons in a logical arrangement to represent a program flow.

40. The computer program product of claim 39, further comprising:

means for selecting a graphical icon; and means for inserting a debugging tool directly into said graphical representation of said application program at said selected graphical icon.

41. The computer program product of claim 40, further comprising:

a debug engine; and means for communicating said selected graphical icon to a debug engine, wherein said debug engine is capable of updating a dynamic dictionary of debug tools existing for said application program.

42. The computer program product of claim 35, wherein said graphical representation of said application program comprises:

a plurality of icons, wherein each icon is connected to another icon by at least one arrow such that the icons represent a program flow.

43. The computer program product of claim 35, wherein said application program is a telephony application program.

44. A programmed computer for graphically debugging a computer application program, comprising:

a display;

a memory for storing computer executable program code;

a processor for executing said program code stored in said memory;

said program code comprises code for representing said computer application program graphically on said display; and said program code comprises code responsive to user input for interacting directly with said graphical representation of said computer application program to debug said computer application program, wherein interaction with the textual source code of said computer application program is not required.

45. The programmed computer of claim 44, further comprising:

a communication adapter for networking with other computers.

46. The programmed computer of claim 45, wherein said computer application program is stored on one of said other computers.

47. The programmed computer of claim 45, wherein said computer application program is executing on one of said other computers, and wherein said program code is executable to perform debug tool management for said computer application program during said computer application program's runtime.

48. The programmed computer of claim 47, wherein said debug tool management comprises functions selected from the group consisting of:

inserting a graphical debugging tool into the source code of said application program, removing an existing graphical debugging tool from the source code of said application program, and modifying an existing graphical debugging tool.

49. The programmed computer of claim 44, further comprising:

an input device for allowing an operator to interact with said computer; and said program code further includes code for accepting inputs from said operator to graphically debug said computer application program.

50. The programmed computer of claim 44, wherein said code for interacting directly with said graphical representation of said computer application program comprises code for inserting a debugging tool directly in said graphical representation, wherein said debugging tool is a breakpoint.

51. The programmed computer of claim 44, wherein said program code comprises code selected from the group consisting of:

code responsive to user input for inserting a graphical debugging tool directly in said graphical representation of said application program, code responsive to user input for removing an existing graphical debugging tool directly from said graphical representation of said application program, and code responsive to user input for modifying an existing graphical debugging tool.

52. The programmed computer of claim 44, wherein said computer application program is a telephony application program.

* * * * *